June 1, 1926.
P. E. HERSCHEL, JR
1,586,526
LAWN MOWER
Filed Sept. 2, 1925
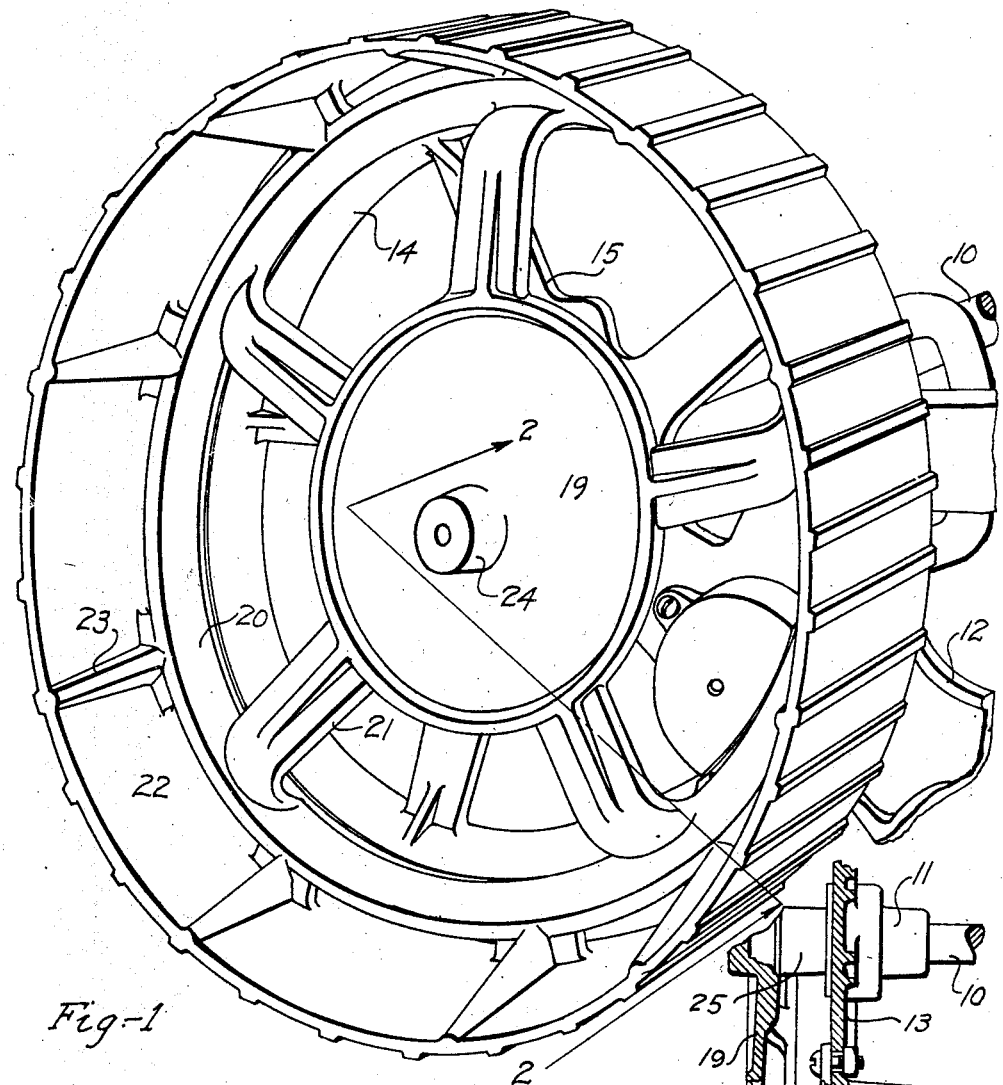
Fig-1
Fig-2
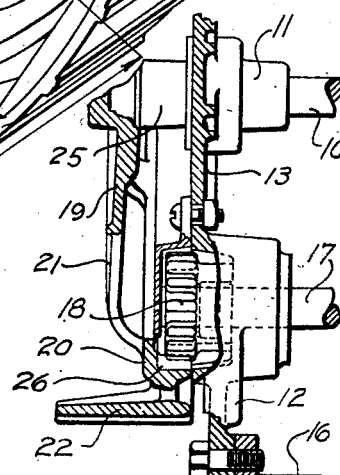

Patented June 1, 1926.

1,586,526

UNITED STATES PATENT OFFICE.

PAUL E. HERSCHEL, JR., OF PEORIA, ILLINOIS.

LAWN MOWER.

Application filed September 2, 1925. Serial No. 54,023.

This invention relates to lawn mowers.

The invention has special reference to the combination of main frame and wheel members; special wheel construction to obtain tractor or relatively wide traction grip of wheel members and the necessary relative arrangement of such wheel tread to the wheel central body and to reinforcement means for the tread member rendered necessary because of wide relative spacing thereof with respect to the wheel web or central body.

Referring to the drawings—

Fig. 1 is a perspective view showing a wheel member in association with the frame of lawn mower;

Fig. 2 is a sectional view on the line 2—2 of Fig. 1.

In the above drawings, so much of the main frame as it is deemed necessary to illustrate includes a shaft member 10 held stationary in the main frame. 11 is a hub member for a wheel centering frame fixed to shaft 10. The wheel centering frame is a part of the main frame, which includes a cutter carrying frame portion 12 extending rearwardly, as in common practice, from shaft members 10 herein. The wheel centering frame includes a center disk portion 13, and a peripheral rim 14 spaced from disk portion 13 and connected therewith by a plurality of relatively spaced connecting or spoke members 15.

A cross frame member 16 in conjunction with shaft 10 serves as a connector means between the frame members at either side of the lawn mower. 17 is a cutter bar shaft supported in the main frame and is provided with cog member 18 which is driven from the wheel members of the mower.

Special reference is made to the wheel members, one of which is shown. The wheel members are specially designed for service in lawn mower use in localities where sand or loose soil conditions prevail, and are made especially wide for utility service in conjunction with soft surface conditions, and also the gripping members on the tractor faces of the wheels are narrowed and exaggerated in radial extension as compared with ordinary mower wheel construction, to the end of enhancing grip utility of the wheels.

The wheel member comprises a central disk portion 19, an annulus 20 spaced from said disk and connected therewith by means of a plurality of relatively spaced spoke or connector members 21, and a tread member 22 integrally or otherwise united to the annulus 20 at its inner edge portion and extending outwardly laterally therefrom an exaggerated distance over that of common lawn mower wheel construction. 23 are reinforcing members for the wheel tread, which may be in form as herein disclosed, constituting gradually tapering members in the nature of angle blocks integrally or otherwise related to the annulus and tread, which serve to prevent springing or deflection of the laterally projecting tread portion of the wheel.

The wheel is provided with hub member 24 interiorly recessed, which recess, in connection with sleeve 25, serves as a means for receiving the outer ends of shaft 10 in thrust relation, and when said wheel is properly related to the frame they are relatively interlocked by means not herein shown in detail, and when so related, cutter bar cog wheel 18 will be in mesh with circumferentially arranged cog train 26 on the inner face of the inner edge of annulus 20, thereby establishing a co-operating relation as between the wheels and frame and driven parts of the lawn mower.

The main thought involved in the application herein is the adaptation of a lawn mower for use in loose soil, as sand, to the end of minimizing labor in operating the same. The invention lies in the means necessarily employed to attain this end, which grows out of the necessary relative arrangement of the annulus 20 with the wheel centering frame, whereby a wheel is built with the framing of the central supporting web portion of the tread wholly at one side of said tread.

What I claim is:

1. A lawn-mower wheel comprising a central disk, a recessed hub formed integral with said disk and adapted to receive one end of a shaft, spokes extending radially from said disk, an annulus formed on the outer ends of said spokes, a tread member secured near its inner edge to said annulus, and reinforcing elements formed upon the inner surface of the tread member and tapering uniformly from said annulus to the outer edge of the tread member.

2. A wheel for lawn-mowers, comprising a recessed hub adapted to form a thrust bearing, spokes radiating from said hub and being curved at their outer ends, an annulus formed on the outer ends of said spokes, a gear element formed on the inner surface of the annulus, and a tread member secured near its inner edge to said annulus and spaced therefrom, all the foregoing elements being formed integrally.

3. A wheel for lawn mowers, comprising a central disk, a recessed hub formed thereon and adapted to form a thrust bearing for a shaft, spokes extending radially from said disk, a relatively narrow annulus formed on the outer ends of said spokes, a gear element formed on the inner surface of said annulus, a relatively wide tread member secured near its inner edge to said annulus and spaced therefrom, and reinforcing elements formed upon the inner surface of the tread member.

4. A wheel for lawn mowers, comprising a central hub member, curved spokes radiating from said hub member, an annulus formed on the outer ends of said spokes, a ring gear formed on said annulus, a tread member secured near one of its edges to said annulus and spaced therefrom, and reinforcing elements formed upon the inner surface of the tread member.

In testimony whereof, I have affixed my signature.

PAUL E. HERSCHEL, Jr.